United States Patent [19]
Webster

[11] Patent Number: 5,927,124
[45] Date of Patent: Jul. 27, 1999

[54] APPARATUS FOR BENDING AND CUTTING TUBING, AND METHOD OF USING SAME

[75] Inventor: M. Craig Webster, Novi, Mich.

[73] Assignee: Adaptive Motion Control Systems, Inc., Wixom, Mich.

[21] Appl. No.: 09/143,598

[22] Filed: Aug. 31, 1998

Related U.S. Application Data

[63] Continuation-in-part of application No. 08/611,396, Mar. 5, 1996, Pat. No. 5,862,697.

[51] Int. Cl.$^6$ ............................... B21F 11/00; B21D 7/04
[52] U.S. Cl. .................................. 72/131; 72/132; 72/155; 72/149
[58] Field of Search ............................... 72/129, 131, 132, 72/149, 155, 157, 158, 159, 294, 369

[56] References Cited

U.S. PATENT DOCUMENTS

| | | |
|---|---|---|
| 3,724,256 | 4/1973 | Kroetch . |
| 3,728,885 | 4/1973 | Ames ........................................ 72/294 |
| 3,949,582 | 4/1976 | Eaton . |
| 4,126,030 | 11/1978 | Zollweg et al. ........................... 72/154 |
| 4,552,006 | 11/1985 | Yogo . |
| 4,760,727 | 8/1988 | VanLandingham . |
| 4,827,816 | 5/1989 | Takaniemi . |
| 4,872,384 | 10/1989 | Borzym . |
| 4,919,025 | 4/1990 | Snyder . |
| 4,970,885 | 11/1990 | Chipp . |
| 4,974,436 | 12/1990 | Nakatsuji . |
| 5,016,507 | 5/1991 | Riera . |
| 5,301,530 | 4/1994 | Beelen . |
| 5,343,725 | 9/1994 | Sabine . |

OTHER PUBLICATIONS

DMC–1000 Manual Rev. 1.5, Galil Motion Control, Inc., Rev. 6–95, pp. 1–1 to 1–4, 2–6 to 2–8, 3–24 to 3–25, 4–31 to 4–32, 5–40 to 5–41, 7–84 to 7–85, 10–128 to10–135.

Baldor Motors and Drives 501, Oct. 2, 1995,product list.
UNICASE™ Parallel In–Line Helical Gearmotors & Speed Reducers information sheet, © 1989 Nord Gear Corporation.

Clincher™ Helical Gearmotors & Speed Reducers information sheet, © 1990 Nord Gear Corporation.
UNICASE™ Helical–Worm Gearmotors & Speed Reducers information sheet, © 1990 Nord Gear Corporation.

*Primary Examiner*—Joseph J. Hail, III
*Assistant Examiner*—Rodney Butler
*Attorney, Agent, or Firm*—Carrier, Blackman & Associates, P.C.; William D. Blackman; Joseph P. Carrier

[57] ABSTRACT

An apparatus for bending and cutting metal tubing includes a support base and a number of components attached thereto. A bend die is rotatably attached to the support base, and is pivotally movable about a pivot axis. The bend die has a tube-receiving peripheral groove, and a first blade guide slot formed therein to receive a first portion of a blade therein. The apparatus also includes a pressure die which is movably attached to the support base, including a reciprocally movable first pressure applicator, and a follower slide which is slidably attached to the first pressure applicator. The follower slide clamps against a portion of tubing, substantially opposite the bend die. The follower slide also has a second blade guide slot formed therein, to recieve a second portion of the blade. The apparatus further includes a movable bend arm assembly for contacting and bending a tubing workpiece against the bend die. A blade holder is attached to the support base for holding and supporting a blade. A reciprocally movable blade actuator is also provided for reciprocally moving the blade holder between extended and retracted positions thereof. In operation, after a section of the tubing workpiece has been bent into a preferred orientation thereof, the second blade guide slot of the follower slide lines up with the first blade guide slot of the bend die to define a blade guide path, and the blade may be moved therethrough to cut through the tubing.

4 Claims, 5 Drawing Sheets

APPARATUS FOR BENDING AND CUTTING TUBING, AND METHOD OF USING SAME

CROSS-REFERENCE TO RELATED APPLICATIONS

The present application is a continuation-in-part of U.S. patent application Ser. No. 08/611,396, filed Mar. 5, 1996, now U.S. Pat. No. 5,862,697, the disclosure of which is hereby incorporated by reference, insofar as it is consistent herewith.

BACKGROUND OF THE INVENTION

1. Field of the invention

The present invention relates to a method and apparatus for bending and cutting metal tubing in a single operation. More particularly, the present invention relates to a method and apparatus for making bent metal tubing pieces in a very precise and reproducible manner, and in which the same machine is operable to perform feeding, bending and cutting operations in an efficient manner. Even more particularly, the present invention relates to a method and apparatus for bending and cutting multiple sections of metal tubing from a single piece of tubing stock.

2. Description of the Background Art

Many types of tubing benders have been developed and are known. Some examples of tubing benders may be found in U.S. Pat. No. 3,724,256, 4,126,030, 4,606,250, 4,703,678 and 5,025,651.

In the previously known methods for manufacturing of short pieces of steel tubing, such as, e.g., exhaust tubing, often times short lengths of straight pre-cut tubing are manually fed, one-by-one, into a machine by an operator. This material may be either stainless steel or ordinary steel. Each short length of pre-cut tubing, in sequence, is then bent into a preferred shape according to a predetermined pattern, which may be stored in computer memory, and when finished, an excess part of the tube is cut off to form a finished part. The excess, which has been trimmed off, is either discarded or recycled as scrap stock. This known process is less than ideal for several reasons. The labor cost of paying a skilled operator, to keep feeding in these short lengths of tubing stock, is relatively high. The safety risk of harm to that operator is higher than it would be if the procedure were automated, or if multiple pieces could be cut off of a single longer piece of tubing stock. Furthermore, in the above-described process, the amount of wasted steel scrap is excessively high.

While many types of tubing benders are known, and some machines exist which can both cut and bend tubing, such as are disclosed in U.S. Pat. No. 3,724,256 and 3,728,885, a need still exists in the art for an automated, synchronized machine, and method of use thereof, which is designed for both tube bending and cutting in a single operation, and which minimizes wasted excess. Ideally, this type of machine would be able to cut several usable finished parts off of a single extended length workpiece of tubing stock. Preferably, such a machine could be designed to have the capability to cut through a workpiece near a bend formed in the workpiece.

SUMMARY OF THE INVENTION

The present invention provides an automated, synchronized machine, and method of use thereof, which is designed for both bending and cutting metal tubing. The apparatus hereof is usable to cut several bent pieces of tubing off of a single long piece of tubing stock, with minimal waste from trimmed-off excess. The apparatus of the present invention allows a cut to be made closer to a bend in the tube than was possible with the previously known equipment.

An apparatus in accordance with the present invention, generally, includes a support base and a number of components attached thereto, including a mechanism for advancing a tubing workpiece therealong. Other components of the apparatus include a bend die, a pressure die assembly, a bend arm assembly, a cutter mechanism, and a programmable electronic controller.

A roughly disc-shaped bend die is provided rotatably attached to the support base, and is pivotally movable about a pivot axis. The bend die has an arcuate peripheral groove formed in an outer side edge thereof, to receive a portion of a tubing workpiece therein. The bend die also has a first blade guide slot formed therein, for receiving a first portion of a blade.

As noted, a pressure die assembly is provided movably attached to the support base. The pressure die assembly includes a reciprocally movable first pressure applicator, and a follower slide which is slidably attached to the first pressure applicator, for concurrent movement alongside a piece of tubing stock as it advances on the base. The follower slide has an inner work surface with an arcuate cutout channel formed therein, to clampingly receive a portion of a tubing workpiece therein, substantially opposite the bend die. The follower slide also has a second blade guide slot formed therein, for alignment with the first blade guide slot of the bend die. The second blade guide slot intersects and communicates with the arcuate cutout channel, to recieve a second portion of a blade.

A rotatably movable bend arm assembly is also provided, movably attached to the support base, for contacting and bending a tubing workpiece against the bend die. The bend arm assembly provides a means for bending tubing. The bend arm assembly is attached to the bend die for concurrent pivotal movement therewith about the bend die pivot axis. The bend arm assembly includes a second pressure applicator and a tube-contacting die connected thereto. Preferably, the bend arm tube-contacting die includes an inner face with an arcuate cutout channel formed therein, to receive a portion of a tubing workpiece therein substantially opposite the arcuate groove of the bend die. The bend arm assembly further includes a bend arm driver for radially moving the bend arm with respect to the pivot axis of the bend die, to form a bend in a piece of metal tubing stock. Preferably, the bend arm driver includes an electric drive motor and associated gearing.

A blade holder is attached to the support base for holding and supporting a blade. Preferably, a blade is also provided which is fixedly and removably attached to the blade holder. A reciprocally movable blade actuator is also provided for reciprocally moving the blade holder between a retracted position spaced apart from the bend die, and an extended position adjacent the bend die.

As previously noted, the present invention also encompasses a method of bending and cutting a tubing workpiece. A method in accordance with the present invention, generally, includes a first step of clamping a tubing workpiece between a pressure die and a bend die, the pressure die and bend die being substantially as described herein.

The method according to the present invention includes a second step of pressing a bend arm against the tubing workpiece, opposite the bend die, and another step of radially moving the bend arm about the bend die pivot axis, to bend the tubing workpiece against the bend die.

The method also includes a further step of advancing the tubing workpiece and the follower slide, as the tubing workpiece is bent, until a desired degree of bend is achieved.

In a subsequent step, once the bending operation is complete, the pressure die is backed off slightly from the tubing workpiece, and the relative positions of the bend die and pressure die are both adjusted until the first blade guide slot is aligned with the second blade guide slot to define a blade guide path. Pressure is then reapplied to the pressure die to firmly clamp the tubing workpiece between the pressure die and the bend die.

The bent piece of tubing is cut off of the tubing stock by the descending blade, in a final step of moving a blade from a retracted position, spaced apart from the bend die, to an extended position adjacent the bend die, whereby the blade passes through the blade guide path, and cuts through the tubing workpiece.

Accordingly, it is an object of the present invention to provide a method and apparatus for bending and cutting tubing, which minimizes scrap produced thereby, and which minimizes labor costs associated with continuously feeding small pieces of precut tubing into the machine.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PRESENTLY PREFERRED EMBODIMENTS

Overview

Figure 1:
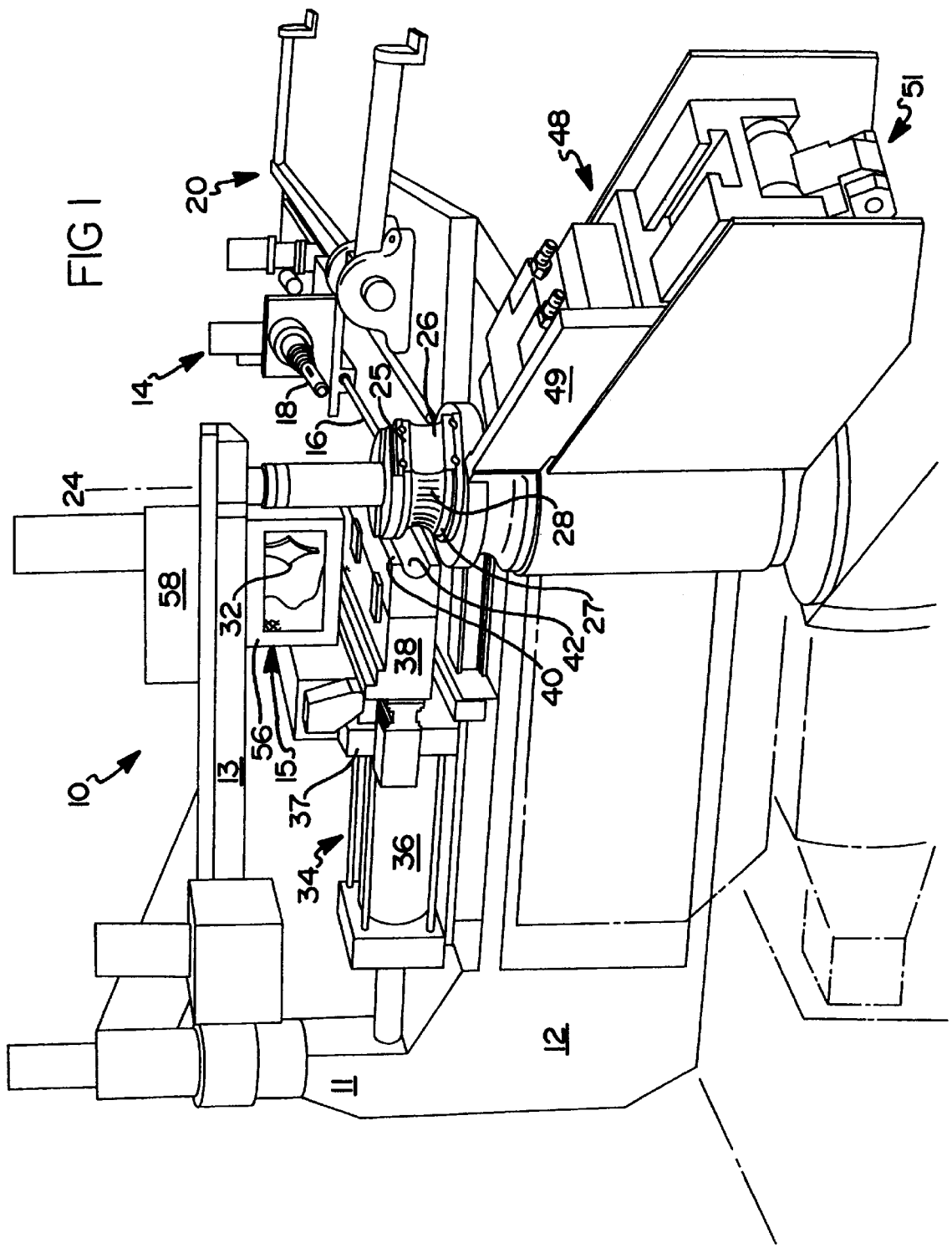
FIG. 1 is a perspective view of an apparatus for cutting and bending tubing, in accordance with the present invention, with an alternate position of a bend arm partially shown in phantom.
Figure 2:
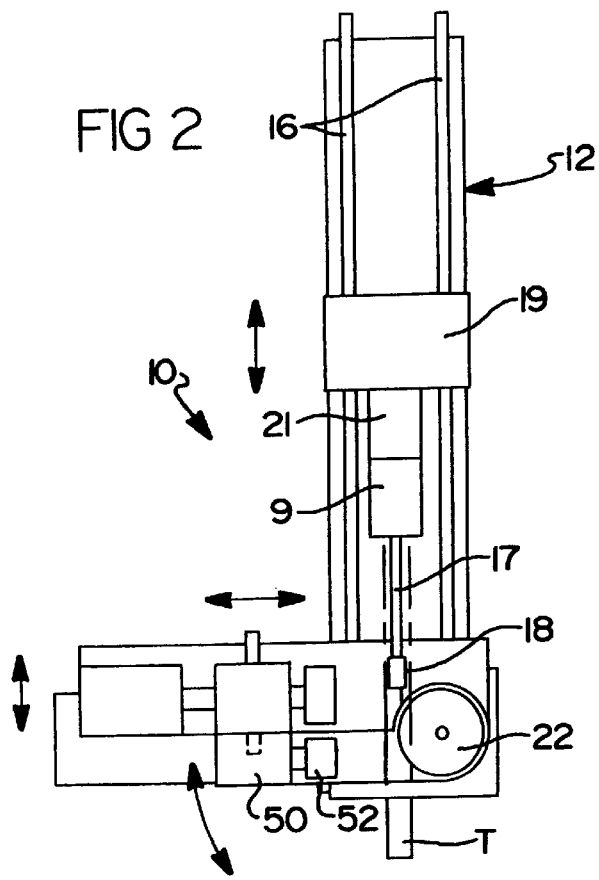
FIG. 2 is a simplified top plan view of an apparatus in accordance with the present invention, shown at a time before a section of tubing is bent.
Figure 3:
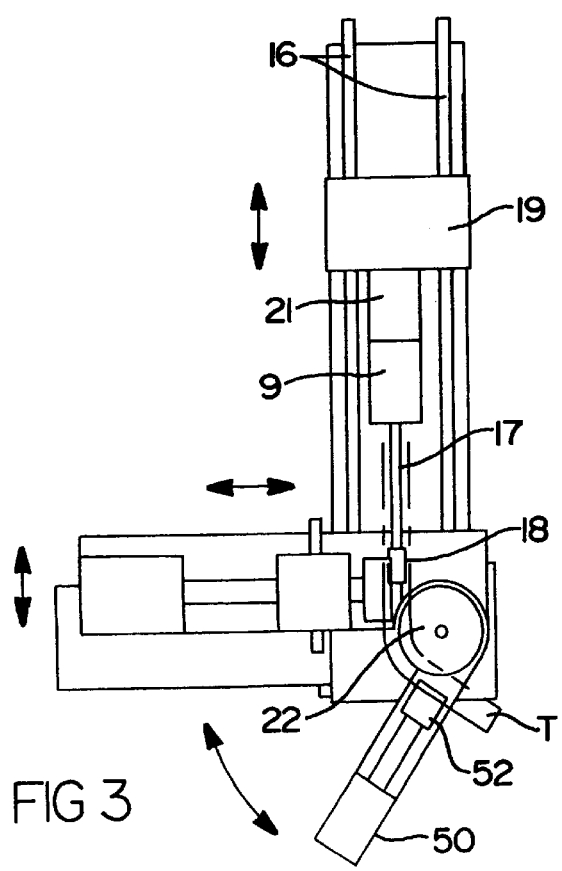
FIG. 3 is a simplified top plan view of the apparatus of FIG. 1, shown at a later time after a section of tubing is bent.

Referring now to the drawings, and particularly to FIGS. 1–3 thereof, an apparatus for bending and cutting tubing is shown generally at 10. The apparatus 10 includes a support base 12 and a tubing advance mechanism 14, attached to the support base, for advancing a tubing workpiece T thereal-ong. Other components of the apparatus include a bend die 22, a pressure die assembly 34, a bend arm assembly 48, a cutter mechanism 15, and a programmable electronic controller 23. Each of these components and subassemblies will be discussed in further detail below. The apparatus may, optionally, include a side loader assembly 20 for loading a tubing workpiece into place on the apparatus.

The Support Base and Tubing Advance Mechanism

The support base 12 includes a number of different pieces, and is preferably made of a strong metal such as cast iron or steel. As best seen in FIG. 1, the support base 12 includes an extension post 11 and a crossover bar 13 attached to the extension post, for cooperating to supportively hold a cutter mechanism 15 above the bend die 22. As noted, a tubing advance mechanism 14 is mounted on the support base. The tubing advance mechanism 14 includes the opposed parallel rails 16, a collet 18, and a drive means 19 (FIGS. 2–3) for advancing the collet 18 along the rails 16. The collet 18 is provided for supportively holding an end of the tubing workpiece T thereon. The collet 18 may be of an inside diameter type or an outside diameter type, and is slidably mounted on the rails 16. The tubing advance mechanism 14 may include a support shaft 17 for the collet 18 (FIGS. 2–3).

The drive means 19 may include an electric motor linked to a ring and pinion gear arrangement, or a hydraulically actuated piston. The tubing advance mechanism 14 further includes a carriage 9 to which the collet 18 is connected, and a tube rotating device 21 to provide for carefully controlled rotatable movement of the collet, with a tubing workpice T thereon, about its own longitudinal axis, so that multiple bends may be made in a section of tubing, and these bends may be disposed in different planes, where desired.

The Bend Die

Figure 4:
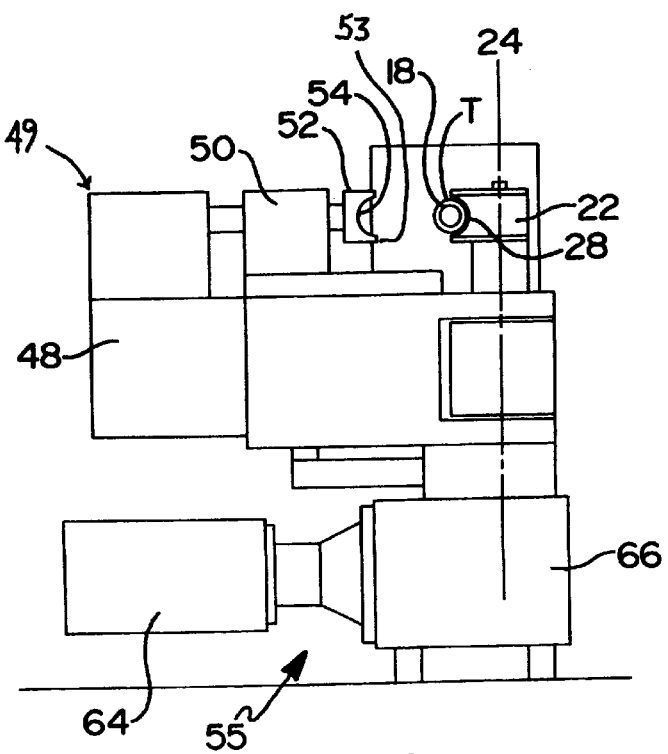
FIG. 4 is an end elevational view of a portion of the apparatus of FIGS. 1–3.
Figure 5:
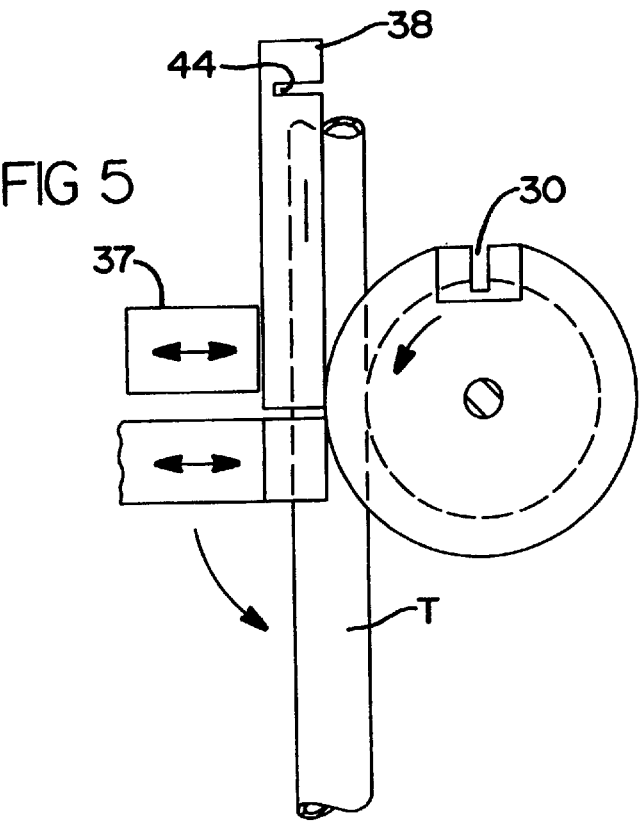
FIG. 5 is a simplified detail top plan view of a section of the apparatus of FIG. 1, before the tubing is bent.

The apparatus 10 also includes a roughly disc-shaped bend die 22, which is rotatably attached to the support base 12. The bend die 22 is pivotally movable about a pivot axis 24. The bend die 22 is provided with a flattened tube-receiving die surface 25 having a curved recess 26 formed therein for nestingly receiving the tubing workpiece T when the bend die is in an initial orientation thereof. The bend die further has a substantially annular outer side edge 27 therearound which connects up to, and which is coextensive with the flattened die surface 25, and the side edge 27 has an arcuate peripheral groove 28 formed therein. As best seen in FIG. 1, the arcuate peripheral groove 28 defines an inner part of a toroidal space therein, around the side edge 27 of the bend die. As best seen in FIG. 4, the side edge 27 of the bend die 22 has a semi-circular cross section at the arcuate peripheral groove 28, to receive a portion of a tubing workpiece T therein. The bend die 22 also has a first blade guide slot 30 (FIG. 5) formed therein to guidingly receive a first portion of a blade 32, at such time that a bend in a tubing workpiece T has been completed. The first blade guide slot 30 intersects and communicates with the arcuate peripheral groove 28 in the bend die 22.

The Pressure Die Assembly

The apparatus 10 also includes a pressure die assembly 34 which is movably attached to the support base 12. The pressure die assembly 34 includes a reciprocally movable first pressure applicator 36 and a follower slide 38, which is slidably attached to the first pressure applicator. The first pressure applicator 36 is provided for applying pressure to the follower slide 38. The first pressure applicator 36 may include a hydraulic piston, or an electric drive mechanism. The first pressure applicator 36 includes a reciprocally movable slide receiving member 37, in which the follower slide 38 is slidably received.

The follower slide 38 is slidably attached to the first pressure applicator 36, as noted, and includes an inner face 40 having an arcuate cutout channel 42 formed therein, to receive a portion of a tubing workpiece T therein, substantially opposite the arcuate peripheral groove 28 of the bend die 22. The follower slide 38 also has a second blade guide slot 44 formed therein (FIG. 5), to recieve a second portion of the blade 32 at such time as a bend is completed in a tubing workpiece T, and the first and second blade guide slots 30, 44 are aligned with one another. The second blade guide slot 44 intersects and communicates with the arcuate cutout channel 42 in the follower slide.

Figure 6:
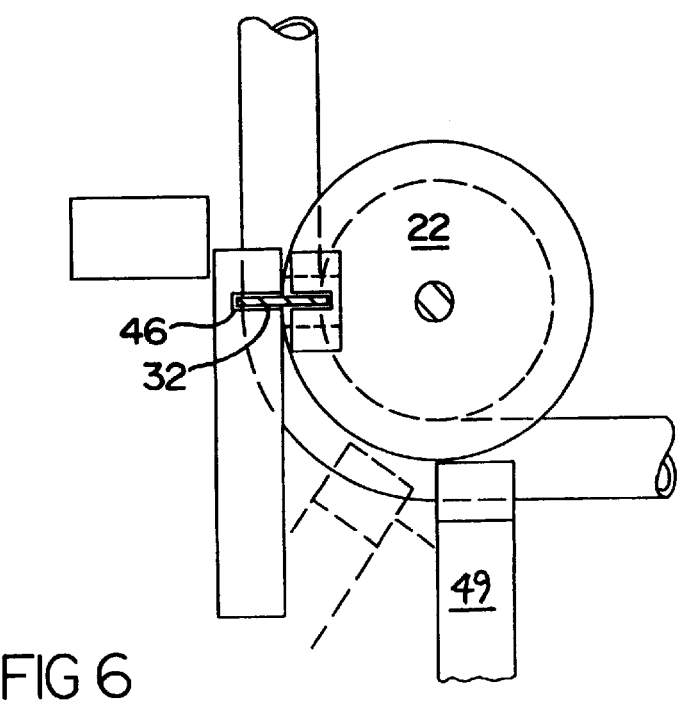
FIG. 6 is a simplified detail top plan view of a section of the apparatus of FIG. 2, after the tubing is bent.

Under certain conditions, after a section of the tubing workpiece T has been bent into a preferred orientation thereof, as seen in FIG. 6, the second blade guide slot 44 of the follower slide 38 is alignable with the first blade guide slot 30 of the bend die 22 to define a blade guide path 46. In general, after a bending operation is complete, the pressure on the pressure die is temporarily released, and the bend die 22 and follower slide 38 are then re-oriented so that the first and second blade guide slots are aligned with one another, to form the blade guide path 46.

The Bend Arm Assembly

The apparatus 10 further includes components for bending a tubing workpiece T against the bend die 22. In the preferred embodiment of the apparatus, the bending components include a bend arm assembly 48 which is pivotally attached to the support base, and which includes parts which are movable in at least two independent directions. An at rest position of the bend arm assembly 48 is shown in phantom in FIG. 1, while a pivotally rotated position of the bend arm assembly is shown in solid lines in FIG. 1.

The bend arm assembly 48 is preferred to be fixedly attached to the bend die 22, for concurrent movement therewith around the pivot axis 24 of the bend die 22. The bend arm assembly 48 includes a bend arm 49 which is preferred to include a reciprocally movable second pressure applicator 50 for applying pressure to a tube-contacting die 52. The bend arm 49 also includes a tube-contacting die 52, attached to the second pressure applicator 50 for reciprocal movement thereof between a retracted position, shown in FIG. 4, and an extended position, shown in FIG. 3, in which the tube-contacting die contacts the tubing workpiece T. The tube-contacting die may be pivotally movable using a linking assembly 51 (FIG. 1), so that it may be dropped down out of the way when not needed, to allow for easier removal of a finished tubing section.

The tube-contacting die 52 has an inner face 53 with an arcuate cutout recess 54 formed therein to receive a portion of a tubing workpiece T therein substantially opposite the arcuate groove 28 of the bend die 22. The bend arm assembly 48 further includes a bend arm driver 55 for radially moving the bend arm 49 with respect to the bend die pivot axis 24. In the preferred embodiment of the present invention, the bend arm driver 55 includes a drive motor 64 and associated gearing 66.

The Cutter

Figure 7:
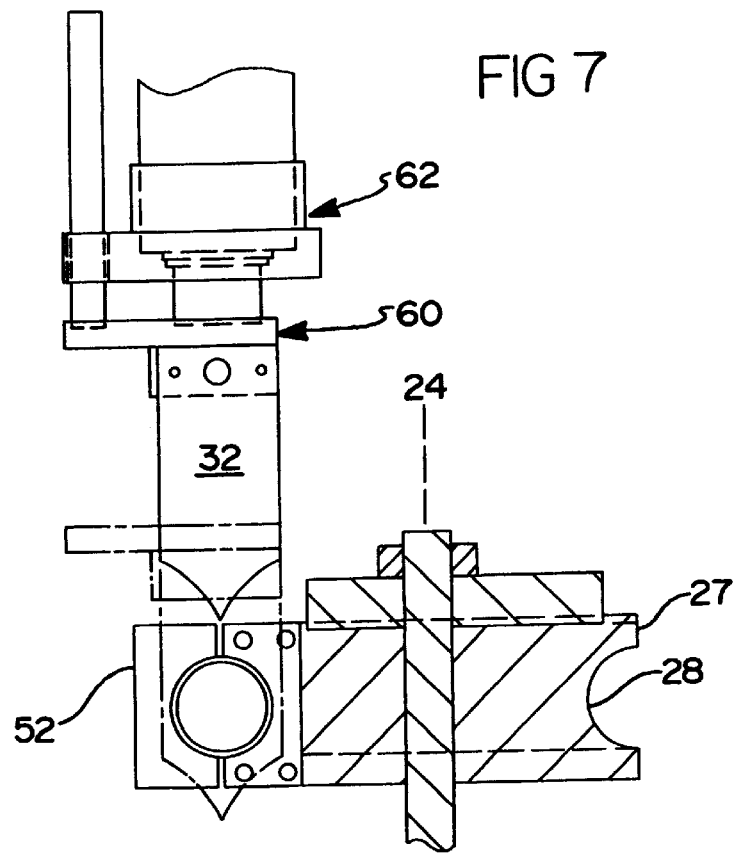
FIG. 7 is a side detail view, partially in cross-section, of a cutting mechanism of the apparatus of FIGS. 1–6, showing a blade holder and a blade in a retracted position, and also showing an extended position of the blade and blade holder in phantom.

As previously noted, the apparatus 10 further includes a tube cutter mechanism 15, which may be housed inside a protective cage 56 (FIG. 1) for safety purposes. The tube cutter mechanism 15 is indirectly connected to the support base 12 by way of the extension post 11 and the crossover bar 13. The cutter mechanism 15 includes a blade holder 60 (FIG. 7) for holding and supporting a blade 32. In the preferred embodiment of the apparatus 10, the blade holder 60 is adjustably mounted to a support member 58 above the support base 12. Preferably, a blade 32 is also provided which is fixedly and removably attached to the blade holder 60. A reciprocally movable blade actuator 62 is also provided for reciprocally moving the blade holder 60 between a retracted position and an extended position thereof. The blade actuator 62 may be hydraulically or electrically driven. In the retracted position, the blade holder 60 is spaced apart from the bend die 22, as shown in solid lines in FIG. 7. In the extended position, the blade holder 60 is disposed adjacent the bend die 22, as shown in phantom in FIG. 7, and drives the attached blade 32 to pierce and cut through the tubing T, passing through the blade guide path 46 formed by the aligned first and second blade guide slots 30, 44.

The Control Mechanism and Dual Feedback Loop

Figure 8:
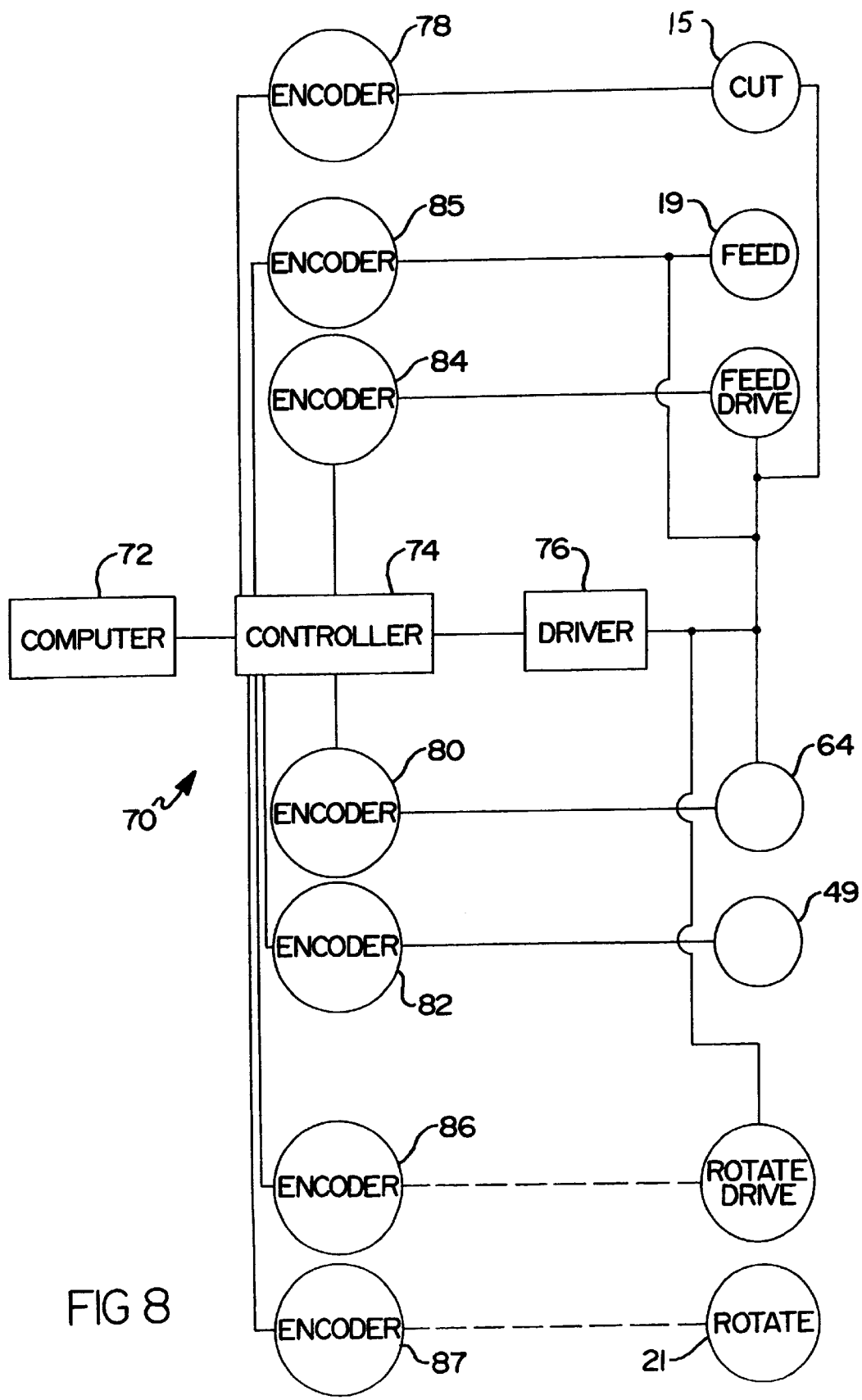
FIG. 8 is a schematic view of a control system in accordance with the present invention.

The present invention preferably includes a control system 70 for programmably controlling the tube bending and cutting operation. Referring now to FIG. 8, a control system 70 is shown schematically. In a preferred embodiment of the invention, the control system 70 preferably includes a computer 72, a controller unit 74, driving member 76, and a plurality of encoders such as encoder 78, as shown. Controller unit 74 is preferably a motion controller that is in electrical communication with the computer 72. The controller unit 74 may be a conventional motion controller.

The controller unit 74 executes user supplied instructions (stored in the memory of the computer 72) and generates signals sent to the motor 64, the tubular workpiece feeding means 19, the tubular workpiece rotating means 21, and the cutting mechanism 15, so as to coordinate the necessary motion of each in performing a tube bending and cutting operation. The controller unit 74 is preferably capable of generating a plurality of modes of motion to the motor 64, the tubular workpiece feeding means 19, the tubular workpiece rotating means 21, and the cutting mechanism 15, including jogging, point-to-point positioning, linear and circular interpolation, and paths which are user-defined. Preferably, the motor 64 is operated as a servo motor.

In one embodiment of the invention, the computer 72 is a personal computer with the controller unit 74 connecting to the PC bus thereof. A software program, written in software language which the controller unit 74 is capable of understanding and interpreting so as to describe action which the apparatus must take in performing the tube bending operation, is preferably stored in memory in the computer 72. When the software program is operated, the commands are transferred to the controller unit 74 for execution.

The controller unit 74 preferably uses feedback from the bend arm rotating means 64, the tubular feeding means 19 and the tubular workpiece rotating means 21, so as to provide a closed loop system for efficiently controlling the motion thereof. As shown in FIG. 8, encoder 80, which is connected to motor 64, generates feedback signals that indicate the position thereof. The encoded signals are then used as input signals to the controller unit 74, so that the desired motion signals may be generated thereby, based on the current position of the motor 64 and the desired position as indicated in the user-supplied software program.

The present invention preferably includes means for substantially continuously eliminating backlash of the bend arm 49. The backlash eliminating means preferably includes a second encoder 82 (FIG. 8) which is connected to the bend arm 49 so as to generate a feedback signal which indicates the position thereof. By creating a dual loop feedback system, the controller unit 74 preferably uses feedback signals from the first encoder 80 for stabilizing the bend arm 49 and uses feedback signals from the second encoder 82 for accurately positioning the bend arm 49. As a result, the present invention substantially compensates for backlash or other effects pertaining to the bend arm 49 which may occur from prolonged use.

Similarly, controller unit 74 preferably accepts feedback from motive components of the tubular workpiece feeding means 19 and the tubular workpiece rotating means 21, so as to provide a closed loop circuit for efficiently controlling the operation thereof. As shown in FIG. 8, third and fourth encoders 84 and 86 are connected to the tubular workpiece feeding means and to the tubular workpiece rotating means 19, 21, respectively, so as to provide feedback to the controller unit 74. In addition, the tubular workpiece feeding means 19 and/or the tubular workpiece rotating means 21 may use a dual loop feedback system by including additional fifth and sixth encoders 85 and 86 which generate feedback signals based on the location and orientation, respectively, of the tubular workpiece T. As a result, the dual loop circuitry substantially compensates for backlash or other unwanted effects which may be associated with the tubular workpiece feeding means 19 and the tubular workpiece rotating means 21, due to prolonged use.

Method of Operating the Apparatus

As previously noted, the present invention also encompasses a method of bending and cutting a tubing workpiece T. A method in accordance with the present invention, generally, includes a first step of clamping a tubing workpiece T between a pressure die 34 and a bend die 22 which is rotatably movable about a pivot axis 24, wherein the bend die 22 and pressure die 34 are substantially as described above in the present specification. The pressure die 34 includes a follower slide 38 as hereinabove described.

The method according to the present invention includes a second step of pressing a portion of a bend arm 49 against the tubing workpiece T, opposite the bend die 22, and radially moving the bend arm about the bend die pivot axis 24, to bend the tubing workpiece against the bend die.

The method also includes a third step of concurrently advancing the tubing workpiece T and the follower slide 38, as the tubing workpiece is bent, until the first blade guide slot 30 is aligned with the second blade guide slot 44 to define a blade guide path 46.

The method according to the present invention further includes a fourth step of moving a blade 32 from a retracted position, spaced apart from the bend die 22, to an extended position adjacent the bend die, whereby the blade passes through the blade guide path 46, and cuts through the tubing workpiece T.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

I claim:

1. Apparatus for bending and cutting metal tubing, comprising:

a support base;

means, attached to the support base, for advancing a tubing workpiece therealong;

a bend die rotatably attached to the support base and being pivotally movable about a pivot axis, said bend die having an outer side edge with an arcuate peripheral groove formed therein to receive a portion of a tubing workpiece, said bend die having a first blade guide slot formed therein to receive a first portion of a blade, said first blade guide slot intersecting and communicating with said arcuate peripheral groove;

a pressure die movably attached to said support base and comprising:
   a) a reciprocally movable first pressure applicator for applying pressure to a follower slide;
   b) a follower slide which is slidably attached to said first pressure applicator and which comprises an inner face having an arcuate cutout channel formed therein to receive a portion of a tubing workpiece therein substantially opposite said bend die, said follower slide having a second blade guide slot formed therein to recieve a second portion of a blade, said second blade guide slot intersecting and communicating with said arcuate cutout channel;

wherein said first blade guide slot of said follower slide is alignable with said second blade guide slot of said bend die to define a blade guide path;

means for bending a tubing workpiece against said bend die;

a blade holder attached to said support base for holding and supporting a blade; and means for reciprocally moving said blade holder between a retracted position spaced apart from said bend die, and an extended position adjacent said bend die.

2. The apparatus of claim 1, further comprising a blade fixedly and removably attached to said blade holder.

3. The apparatus of claim 1, wherein said bending means comprises a bend arm movably attached to said support base, said bend arm comprising:
   a) a reciprocally movable second pressure applicator for applying pressure to a tube-contacting die;
   b) a tube-contacting die attached to said second pressure applicator and having an inner face with an arcuate cutout channel formed therein to receive a portion of a tubing workpiece therein substantially opposite said bend die; and means for radially moving said bend arm with respect to said pivot axis of said bend die.

4. A method of bending and cutting a tubing workpiece, comprising the steps of:

clamping said tubing workpiece between a pressure die and a bend die which is rotatably movable about a pivot axis;

said bend die having an outer side edge with an arcuate peripheral groove formed therein to receive a portion of said tubing workpiece, said bend die further having a first blade guide slot formed therein to receive a first portion of a blade, said first blade guide slot intersecting and communicating with said arcuate peripheral groove;

said pressure die being movably attached to said support base and comprising:
   a) a reciprocally movable pressure applicator for applying pressure to a follower slide;
   b) a follower slide which is slidably attached to said pressure applicator and which comprises an inner face having an arcuate cutout channel formed therein to receive a portion of said tubing workpiece therein substantially opposite said bend die, said follower slide having a second blade guide slot formed therein to recieve a second portion of a blade, said second blade guide slot intersecting and communicating with said arcuate cutout channel;

pressing a bend arm against said tubing workpiece opposite said bend die and radially moving said bend arm about said bend die pivot axis to bend said tubing workpiece against said bend die;

moving said tubing workpiece, said bend die, and said follower slide as said tubing workpiece is bent;

aligning said first blade guide slot with said second blade guide slot to define a blade guide path; and moving a blade from a retracted position spaced apart from said bend die, and an extended position adjacent said bend die, whereby said blade passes through said blade guide path, and cuts through said tubing workpiece.

\* \* \* \* \*